(12) United States Patent
Jing

(10) Patent No.: US 10,123,404 B2
(45) Date of Patent: Nov. 6, 2018

(54) ANTI-STATIC METHOD, ANTI-STATIC DEVICE AND FLAT DISPLAY MANUFACTURING EQUIPMENT

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Yangkun Jing, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 513 days.

(21) Appl. No.: 14/897,920

(22) PCT Filed: Jul. 21, 2015

(86) PCT No.: PCT/CN2015/084551
§ 371 (c)(1),
(2) Date: Dec. 11, 2015

(87) PCT Pub. No.: WO2016/110083
PCT Pub. Date: Jul. 14, 2016

(65) Prior Publication Data
US 2016/0374186 A1    Dec. 22, 2016

(30) Foreign Application Priority Data

Jan. 5, 2015    (CN) .......................... 2015 1 0003164

(51) Int. Cl.
*H01T 23/00* (2006.01)
*H05F 3/06* (2006.01)
(Continued)

(52) U.S. Cl.
CPC ................. *H05F 3/04* (2013.01); *G02F 1/13* (2013.01); *G02F 1/1303* (2013.01)

(58) Field of Classification Search
CPC ... H01T 23/00; H05F 3/06; H05F 3/04; H05F 3/00
(Continued)

(56) References Cited

FOREIGN PATENT DOCUMENTS

CN    1499299 A    5/2004
CN    1851893 A    10/2006
(Continued)

OTHER PUBLICATIONS

CN-1851893; entire specification and drawings.*
(Continued)

*Primary Examiner* — Dharti Patel
(74) *Attorney, Agent, or Firm* — Ladas & Parry LLP; Loren K. Thompson

(57) ABSTRACT

An anti-static method, an anti-static device and flat display manufacture equipment are disclosed. The anti-static device includes an adjustable gas supply system, configured for supplying gas; a plurality of outlets, wherein gas supplied by the gas adjustable system blows a substrate, and discharge needles disposed in the gas outlets and configured for ionizing air near pinpoints of the discharge needles or the gas passing by the pinpoints of the discharge needles, making gas blown out of the gas outlets contain ions. The anti-static device can solve a problem that a display panel is damaged by static charges due to accumulation and hence discharging of static charges in a flat display field.

20 Claims, 7 Drawing Sheets

(51) Int. Cl.
*H05F 3/04* (2006.01)
*H05F 3/00* (2006.01)
*G02F 1/13* (2006.01)

(58) Field of Classification Search
USPC .................................................. 361/212–213
See application file for complete search history.

(56) References Cited

FOREIGN PATENT DOCUMENTS

| | | |
|---|---|---|
| CN | 202103035 U | 1/2012 |
| CN | 103354693 A | 10/2013 |
| CN | 103708714 A | 4/2014 |
| CN | 203510230 U | 4/2014 |
| CN | 10443770 A | 4/2015 |
| CN | 204496136 U | 7/2015 |
| JP | 2000-294472 A | 10/2000 |

OTHER PUBLICATIONS

CN-103354693; entire specification and drawings.*
CN-2035102300; entire specification and drawings.*
International Search Report & Written Opinion Appln. No. PCT/Cn2015/084551; dated Oct. 8, 2015.
First Chinese Office Action dated Oct. 10, 2016; Appln. No. 201510003164.4.
The Second Chinese Office Action dated Jul. 3, 2017; Appln. No. 201510003164.4.

\* cited by examiner

_US 10,123,404 B2_

ANTI-STATIC METHOD, ANTI-STATIC DEVICE AND FLAT DISPLAY MANUFACTURING EQUIPMENT

TECHNICAL FIELD

At least one embodiment of the present invention pertains to an anti-static method, an anti-static device and flat display manufacturing equipment.

BACKGROUND

In a manufacturing process of a flat display panel, the flat display panel is frequently carried or transported. For a manufacturing line with a relatively high automation, an alignment machine is applied to achieve these purposes. A vacuum chuck is provided on an alignment machine. Due to frequent contacting, fitting and separation movement between a vacuum chuck and a display panel in a transportation process, the friction between the alignment machine and the display panel can occur because of the movement, thus leading to accumulation of static electronic charges. Besides, the high-speed operation of the alignment machine can also cause accumulation of static electronic charges. The accumulated static electronic charges can be released along the contact face of alignment machine with the display panel. The release of static electronic charges is very likely to cause damages to the display panel, which can influence product quality and incur lost.

SUMMARY

An anti-static method, an anti-static device and flat display manufacturing equipment are provided in the embodiment of the present invention, whereby a problem that display panels are damaged due to accumulation and release of static charges in a flat display panel field can be solved. In addition, the anti-static device is of low cost, and easy to be installed, used and maintained.

An anti-static device is provided in at least one of the embodiments of the present invention and the anti-static device can be applied in a display manufacture field. The anti-static device comprises an adjustable gas supply system configured for supplying gas, a plurality of gas outlets, gas supplied by the adjustable gas supply system being blown to a substrate; and discharge needles disposed in the gas outlets, and configured for ionizing air near pinpoints of the discharge needles and/or a portion of the gas passing by the pinpoints of the discharge needles by electrically discharging, which can make gas blown from the gas outlets include ionizers.

A flat display manufacturing equipment is provided in at least one of the embodiments of the present invention and the flat display manufacturing equipment comprises the anti-static device mentioned above.

An anti-static method is provided in at least one of the embodiments of the present invention and the method includes: employing an adjustable gas supply system to supply gas; providing a plurality of gas outlets, wherein gas supplied by the adjustable gas supply system is blown to a bottom surface of a substrate and the bottom face is a surface of the substrate contacting with display manufacturing equipment; and ionizing air near pinpoints of discharge needles and/or a portion of the gas passing by the pinpoints of the discharge needles by allowing the discharge needles disposed in the gas outlets to electrically discharge to make the gas blown from the gas outlets include ionizers.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and, it is not limitative to the scope of the present invention.

REFERENCE NUMERALS

7—positive ion, 8—negative ion, 9—display panel, 10—substrate, 101—bottom surface, 11—compressed gas, 20—machine table-board, 21—gas outlet, 22—electronic discharge needle, 23—control module, 24—movable device, 241—drive control portion, 25—adjustable gas supply system, 251—flow control module, 26—voltage supply circuit, 261—voltage regulator module, 27—uniform pressure cabin, 271—gas outlet port of uniform pressure cabin, 272—gas inlet port of uniform pressure cabin, 28—solenoid valve, 29—gas shunt device I, 291—gas shunt device II, 292—gas shunt device III, 30—gas injector, 31—filter, 32—gas channel, 33—sprayer nozzle, 34—pressure-control device, 40—heating chamber, 41—chamber body, 42—heating cavity, 43—heating board, 44—infrared temperature measurement device, 45—thermocouple, 50—inspection chamber, 51—low-radiation protective glass cover, 52—inspection cavity, 53—polarizer, 54—diffusion plate, 55—backlight lamp set, 56—heating board, 60—main part of alignment machine, 61—distance sensor, 62—drive control portion, 63—vacuum chuck, 64—drive control portion, 65—movement guidance slot, 66—centre shaft, 67—toothed belt, 68—driving wheel, 69—driven wheel of toothed belt, 70—center shaft, 71—gas supply pipes connected with respective gas outlets, 72—main gas supply pipe.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Currently, X-ray is employed to irradiate on a substrate from above to solve an electrostatic problem. The inventor of the present invention has noted, in research, that X-ray irradiation can achieve a purpose of eliminating electrostatic, but X-ray is also harmful to human body (an operator is needed to operate in the work zone); in addition, it is of comparatively high cost to assembly, employ and maintain a X-ray generation device.

First Embodiment

Figure 1:
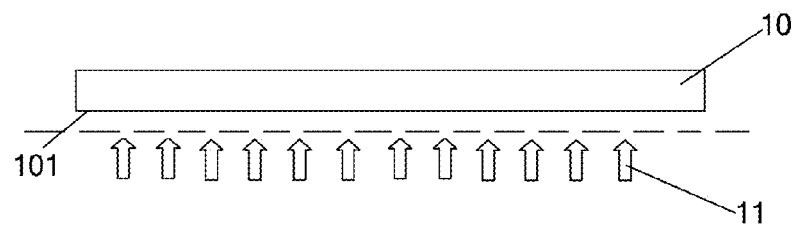
FIG. 1 is a schematic view for principle of an anti-static method applied in a flat display manufacture field in a first embodiment of the present invention.

The embodiment of the present invention provides an electrostatic removal method that is applicable to a display manufacture field (for example, a flat display manufacture field or a non-flat display manufacture field). As illustrated in FIG. 1, the method mainly include: blowing gas 11 containing ions towards a bottom surface 101 of a substrate 10; the bottom surface 101 is a contacting surface of the substrate 10 with an display manufacture equipment (for example, flat display manufacture equipment) and the bottom surface 101 can be, for example, a lower surface of the substrate 10 as illustrated in FIG. 1.

For example, the anti-static method can include: supplying gas (such as compressed gas) by an adjustable gas supply system; providing a plurality of gas outlets, whereby the gas supplied by the adjustable gas supply system is blown towards a bottom surface of a substrate, the bottom surface being a contacting surface of the substrate with an display manufacture equipment; ionizing air near a pinpoint of a discharge needle and/or the portion of the gas passing by the pinpoint of the discharge needle, by allowing the discharge needle disposed in the gas outlets to electrically discharge, to make the gas blown from the gas outlets include ions.

In a manufacture process of a display products (such as a flat display product), display manufacture equipments such as an alignment machine or mechanical arms may frequently contact with, fit and separate from a substrate (the substrate in the embodiment herein is used to collectively refer to display panels and semi-finished products). Due to friction between a substrate and display manufacture equipment, static accumulates on the substrate. To solve this problem, the embodiment provides a method of blowing gas which includes ions towards the bottom surface 101 of the substrate 10 in the case of removing static or avoiding generation of static. On one hand, the ions included in the gas can neutralize static charges generated on the substrate due to friction; on the other hand, friction between a manufacture equipment and the bottom surface 101 of the substrate 10 can be alleviated to avoid accumulation of static charges, and thus preventing the display panel from being damaged by electrostatic discharge. In addition, the method is of low cost, and a corresponding anti-static device is easily to be assembled, employed and maintained.

For example, gas outlets can be disposed on a surface, for bearing, contacting and having friction with a substrate, of a flat display manufacture equipment. When a sensor detects that the substrate approaches to the display manufacture equipment and the distance between the substrate and the manufacture equipment is within a certain range, gas including ions is blown towards the bottom surface 101 of the substrate 10. For example, for manufacture equipments, such as an alignment machine, that are related to an alignment operation with the substrate 10, a method of blowing compressed gas including ions towards the bottom surface 101 of the substrate 10 may also be employed to hold up the substrate 10 for alignment to avoid static charges accumulation due to friction.

On the basis of the above anti-static method, the embodiment of the present invention provides an anti-static device that can be applied in a display manufacture field. The static device can be used for various kinds of display manufacture equipments and especially for flat display manufacture equipments, so as to alleviate friction between the display manufacture equipments and a substrate, neutralize static charges on the substrate, and therefore preventing a display panel from being damaged by static discharges. The static device is of low cost and easy to be realized. Of course, the anti-static device can also be used for production of non-flat display products (such as a display product with a curved face).

Second Embodiment

Figure 2:
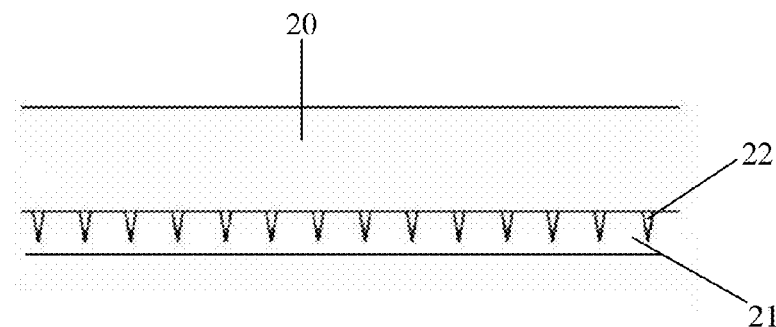
FIG. 2 is a partial structure schematic view of an anti-static device in a second embodiment of the present invention.

An anti-static device, provided in the embodiment of the present invention, is applicable in the display manufacture field (such as a flat display manufacture field). As illustrated in FIG. 1 and FIG. 2, the anti-static device comprises: an adjustable gas supply system (not shown in the figure) for supplying gas (such as compressed gas); a plurality of gas outlets 21, whereby the gas supplied by the adjustable gas supply system is blown towards the bottom surface 101 of the substrate 10 via the gas outlets 21 and the bottom surface is the surface of the substrate 10 contacting with a display manufacture equipment (for example, flat display manufacture equipment); discharge needles 22, disposed in the gas outlets 21 and used for ionizing air near a pinpoint of a discharge needle and/or the portion of the gas passing by the pinpoint of the discharge needle, making the gas blown from the gas outlets 21 include ions.

It is to be noted that gas supplied by the adjustable gas supply system can also be uncompressed gas. In such a case, ionized gas can be formed by other ways or devices such as a fan and then blown towards the gas outlets. In addition, the anti-static device provided in the embodiment of the present invention is also applicable in a non-flat display manufacture field (such as a curved surface display manufacture field). An introduction will be given hereinafter by taking just a case that the anti-static device is applied in the flat display manufacture field and the adjustable gas supply system supplies compressed gas as an example.

Static charges are usually generated due to the frequent friction between a substrate and flat display manufacture equipment in processes such as contacting, fitting, alignment and separation therebetween. The anti-static device provided in the embodiment of the present invention is an ionized gas source. Gas including ions is blown towards a contact surface between a flat display manufacture equipment and a substrate, whereby static charges produced due to friction can be neutralized so as to avoid accumulation of static charges and hence eliminate electrostatic damage. For example, gas can be blown from the gas outlets 21 towards the bottom surface 101 (the bottom surface is a surface that contacts with the flat display manufacture equipment and is prone to accumulate static charges) of the substrate 10. As illustrated in FIG. 1, gas can be blown towards the bottom surface 101 directly in a down-up manner from below the substrate 10. According to actual situation, gas may also be elected to blown, from a side of the substrate 10, towards the bottom surface 101 and the contact surface between the substrate 10 and flat display manufacture equipment. For a first case that gas is blown towards the bottom surface 101 of the substrate in the down-up manner, the gas outlets 21 can be formed on a surface (a machine table-board 20), for bearing, contacting with and having friction with the substrate, of the flat display manufacture equipment. The gas outlets 21 can be of a slit as illustrated in FIG. 2 or distributed gas holes.

The adjustable gas supply system is used to supply compressed gas (for example, compressed air), and the gas flow and pressure of the compressed gas can be adjusted according to actual situations. Atmospheric pressure of three to five is usually required for the compressed gas, and such a value belongs to a relatively low range for compressed air, which can be achieved by a common air compressor. In this way, on one hand, an investment of equipment can be decreased, and on the other hand, power consumption can also be reduced.

The discharge needles 22 can conduct electrical discharging after being electrically connected to a discharge high voltage to ionize air near the pinpoints and the discharge needles 22 is usually of a pin-shaped metal element. For example, the discharge needles 22 can be arranged according to a certain geometric rule or density, and the discharge high voltage can usually reach up to 5 KV-50 KV.

The gas outlets 21 are used to blow out the compressed gas to form a laminar gas flow and the laminar gas flow can bring the ions near the pinpoint of the discharge needle 22 to a surface of a substrate that has accumulated static charges thereon. The gas outlets 21 may be of a slit shape or a long flat shape, which is similar to a gas source generation device. The shape of the gas outlets 21 can be designed according to actual situation, so as to eliminate static charges accumulated on the surface of the substrate, and the shape is not limitative to what is described above. In addition, the gas outlets are provided in the upstream portion of the discharge needles 22 (at an end of the discharge needles 22 away from the above surface (the bottom surface) of the substrate), so the laminar gas flow that is formed can blow ions ionized by the discharge needle 22 to the surface of the substrate.

Further, for example, the anti-static device can also include a control module and the control module is used to adjust ion concentration on a surface of the substrate 10 by adjusting the discharging voltage of the discharge needles 22, the gas flux from the gas outlet of the adjustable gas supply system, and/or the distance between the gas outlets 21 and the above surface (the bottom surface) of the substrate 10. A control module that is independent from the flat display manufacture equipment or an inherent control module of the flat display manufacture equipment can be employed as long as the above control function is achieved.

Figure 3:
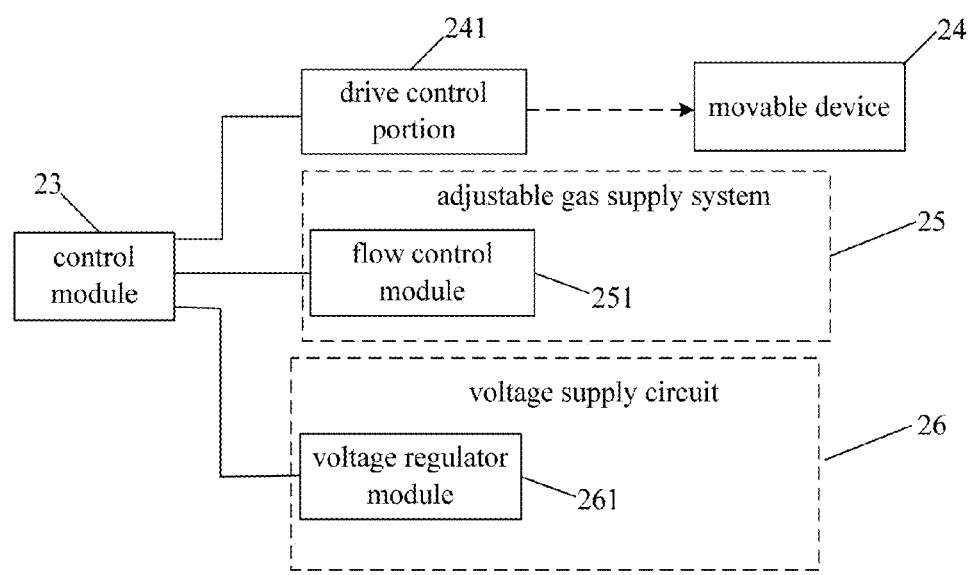
FIG. 3 is a schematic view of a control system for the anti-static device in the second embodiment of the present invention.

Specifically, as illustrated in FIG. 3, the anti-static device further include a movable device 24 and a drive control portion 241 for driving and controlling the movement of the movable device. The plurality of the gas outlets is disposed on the movable device 24. The drive control portion 241 is connected to the control module 23 (such as a computer, etc.) while the movable device 24 cooperate with the drive control portion 241 to make the distance between the gas outlets 21 and the surface of the substrate 10 adjustable by the control module 23. The adjustable gas supply system 25 includes a gas flow control module 251 (such as a solenoid valve) that is used to control output gas flux (gas flux of the gas outlets). The gas flow control module 251 is connected with the control module 23. A voltage supply circuit 26 for the discharge needles 21 includes a voltage regulator module 261 (such as a transformer) that is connected to the control module 23. By controlling the discharge voltage of the discharge needles 22, the gas flux of the gas outlets of the gas supply system 25 and the distance between the gas outlets 21 and the surface of the substrate 10, the control module 23 can achieve the purpose of adjusting ion concentration on the surface of the substrate 10.

Further, for example, a static measurement module can be included in the anti-static device to test static removal results so as to control whether to continue spraying ionized gas towards the substrate for static elimination or not.

The control method of the anti-static device provided in an embodiment will be described simply for example as below: step 1, electrically connecting the discharge needles 22 to a discharge high-voltage to make the discharge needles 22 ionize air nearby via discharging at pinpoints; step 2, the adjustable gas supply system supplies compressed air (such as compressed air) to the gas outlets 21, and the flux and atmospheric pressure of the compressed gas is controllable by the control module 23 according to actual needs; step 3, blowing the compressed gas via the gas outlets 21 to form a laminar gas flow that can bring ions nearby the pinpoints of the discharge needles 22 to a substrate surface with static charges accumulated thereon; step 4, adjusting the concentration of the ions reaching the surface of the substrate 10 by regulating the discharge voltage of the discharge needles 22, the gas flux from the gas outlets 21 of the adjustable gas supply system 25 and the distance between the gas outlets 21 and the surface of the substrate 10, so as to achieve favorable effect of static charge removal. It is necessary to be noted that the sequence of the above steps is not limited, in a process of employing the anti-static device, the above discharge high-voltage, the gas flux of the gas inlets and the distance between the gas outlets and the substrate surface can be regulated according to actual needs for ion concentration.

Figure 4:
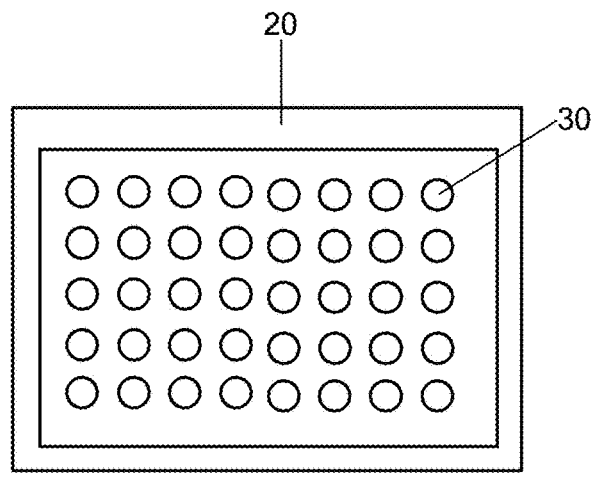
FIG. 4 is a schematic view of gas outlets of the anti-static device in the second embodiment of the present invention.

Further, for example, in a case where an alignment operation is required for a substrate, gas sprayed out of an anti-static device can also be employed to hold up the substrate for alignment, which can avoid accumulation of static charges produced due to friction in the alignment process. As illustrated in FIG. 4, to realize favorable control of gas flow for holding up the substrate, the gas outlets 21 are provided inside with a gas injector 30, or the gas outlets 21 are directly formed by the gas injector.

Figure 5:
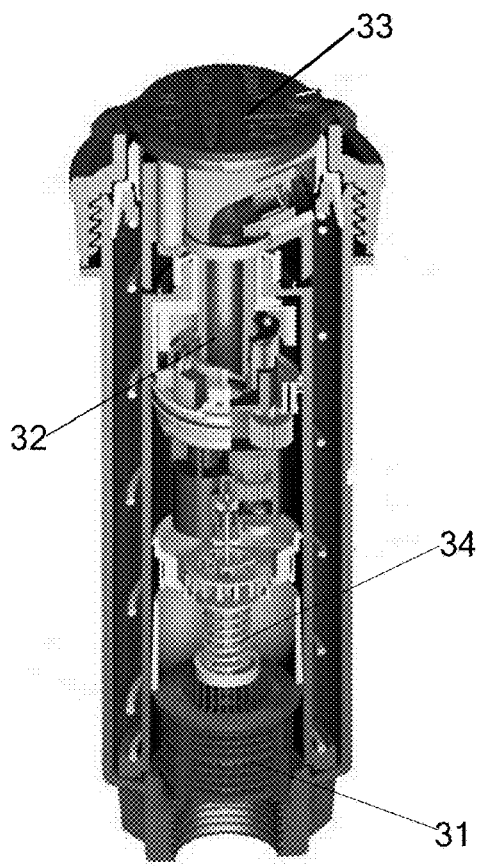
FIG. 5 is a structure schematic view of a gas injector in the second embodiment of the present invention.

For example, the gas injector is illustrated in FIG. 5, and comprises a filter 31, a gas channel 32 and a sprayer nozzle 33; an inlet end of the gas spaying device is connected to an gas outlet 21 of the adjustable gas supply system via a pipe and the compressed gas supplied by the adjustable gas supply system enters into the gas injector via the inlet end, and is sprayed out from the sprayer nozzle 33 after passing the filter 31, gas channel 32.

For example, the gas channel 32 of the gas injector can be a spiral shape, and is capable of spraying out a spiral gas flow that forms a gas cushion and produces a greater uplift force to more easily hold up the substrate.

For example, a gas flow passage (here the gas flow passage refers to the whole pass from the inlet end to the outlet end of the gas injector and the gas channel 32 above merely refers to a small part of the gas flow passage prior to the sprayer nozzle) of the gas injector is provided with: a pressure control device 34, for measuring and adjusting pressure of the gas sprayed out of the sprayer nozzle, and connected to the control module 23. The gas injector 30 is added, blowing gas in a down-up manner, and a spiral gas channel is configured to form a gas cushion to hold up the substrate for alignment, whereby friction is reduced so as to eliminate the fundamental mechanism for generation of static charges and hence eliminate static charge accumulation. The gas injector 30, in combination with control on the inlet gas flux in previous passage and the distance between the gas outlet and the substrate surface as described above, can more precisely control the strength of the gas flow sprayed from the anti-static device, cooperating with alignment control to realize alignment without causing friction.

Figure 6:
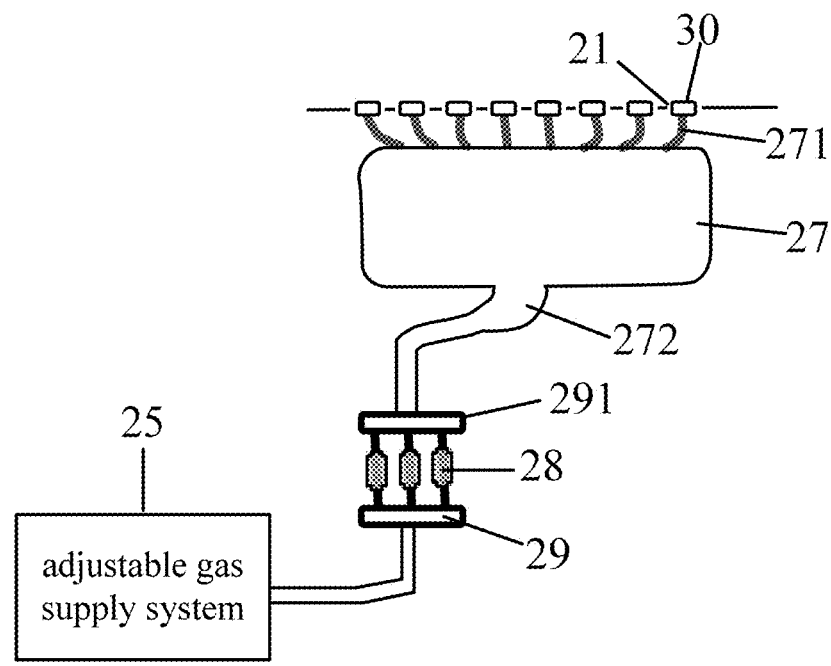
FIG. 6 is a structure schematic view of the anti-static device in the second embodiment of the present invention.

As illustrated in FIG. 6, in at least one embodiment, a gas flow passage from the adjustable gas supply system to the gas outlets is disposed with: a uniform pressure cabin 27 formed in a closed space. An outlet end 271 of the uniform pressure cabin 27 is connected to an inlet end of the gas injector 30 via a pipe while an inlet end 272 of the uniform pressure cabin 27 is connected to an outlet of the adjustable gas supply system 25 via a pipe; the uniform pressure cabin 27 can make the pressure of the gas sprayed out of the gas outlets 21 uniform, so as to avoid the case that the substrate is slanted or becomes unlevelly to disadvantageously effect the manufacture process.

For example, the inlet 272 of the uniform pressure cabin 27 is a pipe that gradually becomes thick or is provided inside with a structure such as a block board to prevent gas flushing in via the inlet port 272 from influencing the pressure of the outlet, hence making the pressure of the gas sprayed out of the respective gas outlets 21 uniform.

In addition, if the gas injector 30 is not provided within a gas outlet 21, the outlet end 271 of the uniform pressure cabin 27 can be directly connected to the plurality of the gas outlets 21 or the plurality of the gas outlets 21 can be directly disposed on the uniform pressure cabin 27 and the outlet end 271 of the uniform pressure cabin 27 directly forms the gas outlets 21.

Further, for example, over a gas flow passage between the adjustable gas supply system 25 and the gas outlets 21, such as the gas flow passage before the compressed gas enters the uniform pressure cabin 27, a solenoid valve 28 can be disposed, and the solenoid valve 28 is connected to the control module 23. For example, a plurality of branch passes can be formed from the gas flow passage, which comes out of the adjustable gas supply system 25, by a first gas shunt device 29 and each branch pass is provided with a solenoid valve 28, and a second gas shunt device 291 is employed to combine the respective branch passes into one gas flow passage. The solenoid valve 28 provided in this way can improve the controllability of the gas flow.

The anti-static device provided in the embodiment of the present invention can be applied in various kinds of flat display manufacture equipment to alleviate friction and neutralize static charges on a substrate, so as to prevent static discharging from damaging a display panel; in addition, such anti-static device is of low cost and easy to be realized. On the other hand, in some embodiments, the gas flow can be adjusted and controlled by an adjustable gas supply system 25, a solenoid valve 28, a gas injector 30 of the anti-static device, in combination with the control on the distance between gas outlets and a surface of the substrate mentioned above, the strength of the gas flow sprayed out of the anti-static device can be more precisely controlled, cooperating with alignment control, and thus realizing alignment without friction.

A flat display manufacture equipment is provided in the embodiment of the present invention and comprises the anti-static device according to any one of the embodiments above.

The anti-static device can be specifically installed on various kinds of flat display manufacture equipments such as electrostatic spinning equipment, heat-curing equipment, inspection equipment required to be applied with pressure, and alignment/rotation machine, for alleviating friction between a substrate and an equipment, neutralize static charges on the substrate, so as to prevent static discharging from damaging a display panel, in addition, the anti-static device is of low cost and easy to be realized.

For example, the flat display manufacture equipment above may further comprise: a distance sensor, configured for sensing the distance between a substrate and a flat display manufacture equipment. The distance sensor is employed to sense the distance between a substrate and a flat display manufacture equipment, hence realizing cooperation of spraying gas and the process of receiving and sending substrates.

In order to allow those skilled in the art to better understand technical solutions provided in the embodiments of the present invention, structures of an anti-static device and a flat display manufacture equipment provided in the invention will be described in detail hereinafter via specific examples.

(1) Static Spinning Equipment

Static spinning is a particular fiber manufacturing process, and employs polymer solution or polymer melt to carry out spinning by spraying in a high electrical field. Under effect of the electric field, the liquid drop at a pinpoint will be transformed from a spherical shape to a conical shape (namely, "Talor cone"), and then extends from the tip of the cone to produce a fiber filament. Polymer filaments of nanoscale diameter can be produced in such a manufacturing process. The static spinning technique is also a simple and efficient technique for preparing a micro-nano fiber thin film. The static spinning technique becomes greatly attractive because of advantages such as low cost for necessary equipment and experiments, large specific surface area of produced fiber and widespread applicability. In a fabrication of a liquid crystal screen, the technique can be employed to prepare a thin film such as ITO (Indium tin oxide) transparent conductive film.

In a fabrication process of a liquid crystal screen, an anti-static device can be employed to neutralize static charges accumulated on a substrate surface. Gas outlets of the anti-static device can be disposed in the interspace between static spinning modules. For example, a discharge voltage is usually 5 kv-50 kv; the gas flux of the inlet is usually 500~3000 $m^3/h$; and the distance range between the gas outlets and the substrate surface is usually 5-40 cm. The advantage of the above value range includes: neutralizing electrical charges on the substrate surface without disturbing a steady progress of fabricating a liquid crystal screen in a static spinning process. A high voltage, a large gas flow and a small distance can produce more favorable neutralization effect; however, they can also disturb progress of the static spinning process. Therefore, adjustment of the above technical parameters is to seek a balance between fabrication of a liquid crystal screen and neutralization effect.

Experiment Data 1

In a fabrication process of a liquid crystal screen, in order to neutralize static charges accumulated on a substrate surface, the above anti-static device can be employed for carrying out static charges elimination. The spinning nozzle of liquid crystal screen manufacture equipment sprays a solution of polyving akohol/dimethyl sulfoxide of 10 wt %. Specific experimental parameters are as follows: the discharge voltage of a discharge needle is 5 kv; the pressure of the compressed gas supplied by an adjustable gas supply system is 3 atmospheric pressures; the distance between the gas outlets and the substrate surface is 20 cm; and the air flux of the outlets is 1000 m$^3$/h. After the above anti-static device is employed for static charge removal, the liquid crystal screen manufacture equipment can operate continually for 48 hours without experiencing a situation that the spinning process can not be carried on; while in the case where the above anti-static device is not employed, the liquid crystal screen manufacture equipment cannot keep on operating steadily only after 3 hours since start of each operation each time.

Experimental Data 2

The spinning nozzle of liquid crystal screen manufacture equipment sprays PE (polyethylene) flux and the flux temperature is 250☐. Specific experimental parameters are as follows: the discharge voltage of a discharge needle is 30 kv; the pressure of the compressed gas (such as compressed air) supplied by an adjustable gas supply system is of 5 atmospheric pressures; the distance between the outlets and the substrate surface is 40 cm; and the gas flow (such as air flow) of the outlet is 2000 m$^3$/h. After the above anti-static device is employed for static charge removal, the liquid crystal screen manufacture equipment can operate continually for 48 hours without experiencing a situation that the spinning process cannot be carried on; while in the case where the above anti-static device is not employed, the liquid crystal screen manufacture equipment can not keep on operating steadily only after 2 hours since start of each operation each time.

In the embodiment of the present invention, gas (such as air) can be ionized by a discharge needle of the above anti-static device and the ions will be blown to a substrate surface by a laminar gas flow formed of compressed gas (such as compressed air) to neutralize accumulated static. Direction of the laminar gas flow can be accurately and safely control led.

(2) Heat-Curing Equipment

In a flat display (such as liquid crystal display) manufacture process, pressure should be applied in a cell-assembly process and the purpose of applying pressure is to make the liquid crystal screen reach the state in which for example columnar spacers work to support, and this process is done by means of a heat-curing equipment. If a certain atmospheric pressure exists around a substrate, glue can more closely contact with glass and hence a more favorable curing state can be obtained. Therefore, the heat-curing equipment provided in the embodiment of the present invention employs the gas sprayed out of the above anti-static device as the gas for exerting pressure on the cell in a cell-assembly process.

Figure 7:
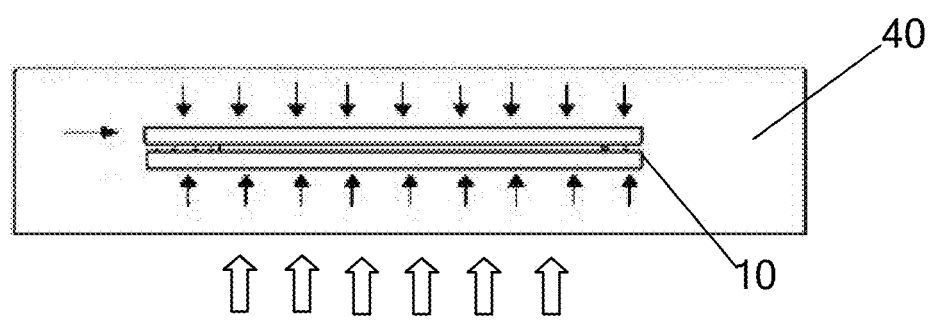
FIG. 7 is a schematic view for principle of a heat-curing equipment in the second embodiment of the present invention.

As illustrated in FIG. 7, in the heat-curing equipment provided in the embodiment of the present invention, a high pressure gas flow containing ions sprayed out of the above anti-static device is employed, and the sprayed gas follow provide pressure for the substrate 10, on a lower part of a heating cavity 40, while a parallel heating board is employed to heat uniformly on an upper part of the heating cavity 40. In addition, the above anti-static device may be employed to directly spry high temperature/high pressure gas flow, that is, exert pressure while conducting heat-treatment.

Figure 8:
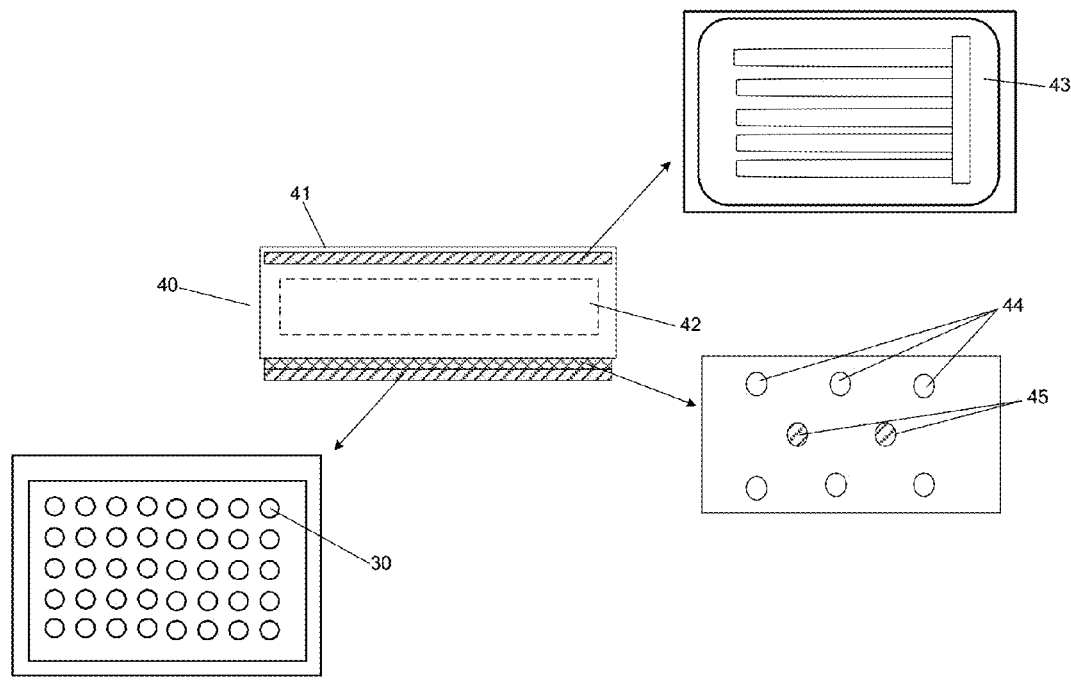
FIG. 8 is a structure schematic view for the heating chamber in the heat-curing equipment in the second embodiment of the present invention.

Specifically speaking, as illustrated in FIG. 8, a heating chamber 40 includes: a chamber body 41 formed of heat-resisting ceramics, a heating cavity 42 formed inside the chamber body 41 and configured for accommodating a substrate, a heating board 43 (such as a silicon rubber heating board) disposed on the top/upper part of the heating cavity 42 and used as a heating source, an infrared temperature detector 44 and a thermocouple 45 that are disposed on a bottom/lower part of the heating cavity 42 and used for measuring temperature, and a infrared distance sensor device. Gas outlets formed by the gas injector 30 are also disposed on a bottom/lower part of the heating cavity 42 and hence gas is blown from a lower side to generate a spiral gas flow that can form an air cushion to hold up the substrate for cell-assembly, which can effectively avoid black abnormal point (black gap) due to uneven thickness of boxes. Of course, the gas outlets formed by the gas injector 30 can also be disposed on other positions of the heating cavity 40, only if gas sprayed out of the gas outlets of the anti-static device can be employed as gas for exerting pressure on boxes.

(3) Pressuring Inspection Equipment

The anti-static device, provided in the embodiment of the present invention, can also be used in an inspection equipment that requires pressuring, so as to remove static charges and supply pressure that is required for inspection of product to be inspected. Gas sprayed out of an anti-static device is employed by the inspection equipment provided in the embodiment to exert pressure in an inspection cavity of the inspection equipment.

Figure 9:
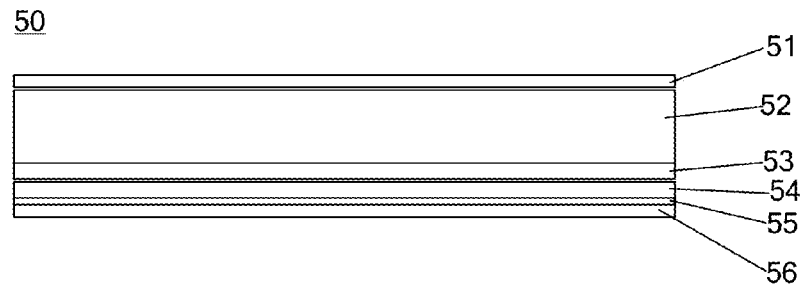
FIG. 9 is a specific structure schematic view of an inspection chamber of inspection equipment in the second embodiment of the present invention.

FIG. 9 is a schematic view of specific structure of a test chamber. The test chamber includes: a low-radiation protective glass cover 51 (inspection window), an inspection cavity 52, a polarizer 53, a diffuser board 54, a backlight lamp set 55, and a heating board 56. Compared with conventional test equipment in the related field, the difference of the test chamber 50 in the embodiment lies in that the gas outlet of the anti-static device, provided in the embodiment of the present invention, is disposed on inner wall of the inspection cavity 52 to remove static charges and supply pressure that is required for inspection of product to be inspected. Other structure is basically the same as a conventional inspection equipment in the field and is not described in detail.

(4) Alignment Machine

The anti-static device, provided in the embodiment of the present invention, can also be used in alignment/rotation machine. Specifically, the alignment/rotation machine employs the gas sprayed out of the anti-static device to hold up a substrate for alignment.

Figure 10:
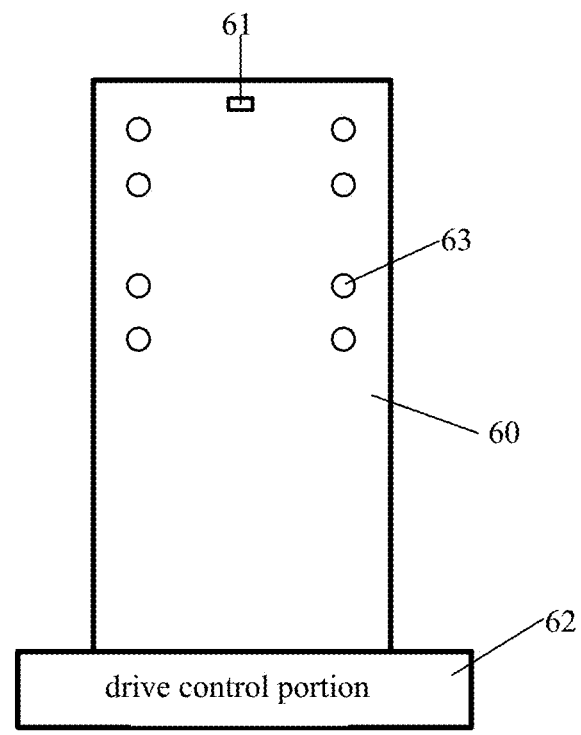
FIG. 10 is a top structure schematic view of alignment machine.
Figure 11:
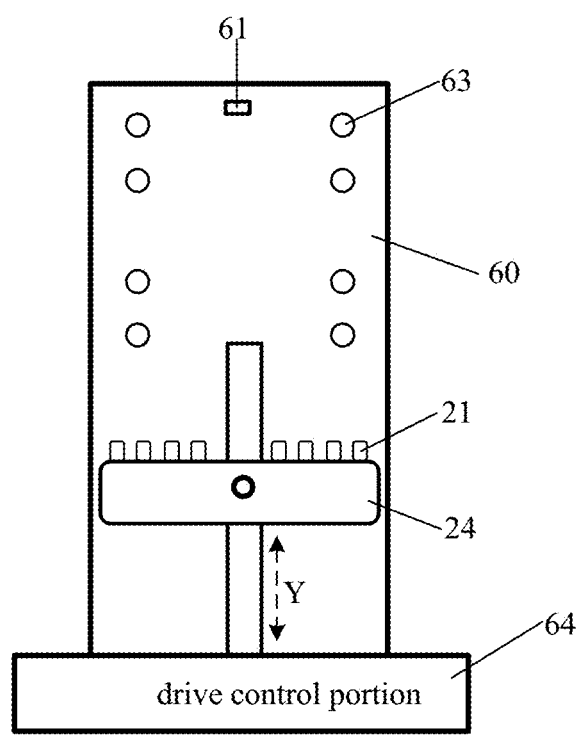
FIG. 11 is a top structure schematic view of the alignment machine in the second embodiment of the present invention.

FIG. 10 is a top view of alignment machine. As illustrated in FIG. 10, the alignment machine comprises a main structure 60, a drive control portion 62, a distance sensor 61, and a vacuum chunk 63. The main structure 60 of the alignment machine has a certain strength and thickness, and is hollow and provided inside with necessary pipelines and wires disposed such as vacuum tubes and sensor wires. The distance sensor 61 is disposed at a front end of a table-board of the main structure 60 and can sense the distance between a substrate and a surface of the alignment machine. The drive control portion 62 is responsible for the movement control of the alignment machine and relevant electrical control, which can be combined with a test signal of the distance sensor 61, so as to realize the cooperation between the vacuum chunk 63 and the substrate that is received or sent out.

The new alignment machines provided in the embodiment of the present invention are disposed with an anti-static device provided in the embodiment of the present invention. Out of various kinds of specific design structures, merely two of them are described hereinafter as references.

A new alignment machine provided in the embodiment of the present invention, except being disposed with a movable anti-static device, is approximately similar to the structure as illustrated in FIG. 10 above. As illustrated in FIG. 11-FIG. 14, specifically, the alignment machine is also disposed with a movable device 24 and the gas outlet 21 of the anti-static device is disposed on the movable device 24. The movable device 24 can move up and down along Y-axis under effect of drive control portion 64. Position of an anti-static device for static charge removal is determined correspondingly according to different sizes of substrates; by means of electrical control and movement of the movable device 24 along Y-axis, substrates of different sizes, in a transportation process, can automatically arrive at a distance effective for static charge removal. The main structure 60 of the alignment machine, which is similar to the alignment machine illustrated in FIG. 10, has a certain strength and thickness, and is hollow and provided inside with, besides being disposed with necessary pipelines and wires such as vacuum tubes and sensor wires, gas pipelines for an anti-static device, such as an adjustable gas supply system, gas transmission pipes and a solenoid valve 28. A distance sensor 61 is disposed at a front end of the alignment machine to sense a distance between a display panel and a surface of the alignment machine. A vacuum chuck 63 is disposed on the table-board of the alignment machine and the vacuum chuck 63 is connected, from its bottom, to the vacuum equipment disposed inside the cavity such as vacuum tubes, and hence the vacuum chuck 63 can fix a display panel to the alignment machine via vacuum absorption. A drive control portion 64 is employed to execute movement control and relevant electrical control of the alignment machine and the anti-static device, so as to realize the cooperation of the gas sprayed from the anti-static device, absorption by the vacuum chuck 63 and receiving or sending of the substrate. The drive control portion 64 herein can be understood as function extension of the drive control portion 62 of the alignment machine as illustrated in FIG. 10, which not only includes the alignment control function of the drive control portion 62 as illustrated in FIG. 10, but also includes the control module function in the anti-static device, the drive control function for the movable device 24 and also coordination among these functions, etc. In summary, the drive control portion 64 in the embodiment can be employed to realize control and coordination of respective mechanical and electrical components in processes of receiving, sending and aligning substrates.

Figure 12:
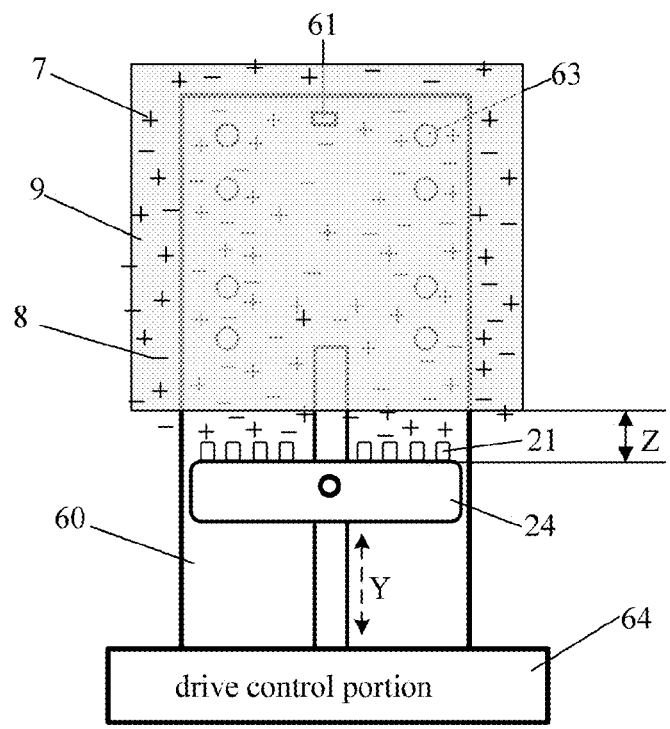
FIG. 12 is a top view of an alignment machine with a screen thereon, after an anti-static device is installed, in the second embodiment of the present invention.

FIG. 12 is a top view of an alignment machine with a screen thereon, after an anti-static device is installed. In FIG. 12, reference number 9 represents a display panel that is fixed to the alignment machine by absorption of a vacuum chuck 63. The reference number 8 and 9 respectively represents positive and negative ions generated by the anti-static device, and a distance Z represents the distance between gas outlets 21 of an anti-static device and a periphery edge of the display panel 9. To ensure static charge removal effects, in practice, the distance Z is usually greater than 50 mm by the movement of the movable device 24 along the Y-axis controlled by the drive control portion 62.

It is not limited in the embodiment of the present invention how the movable device 24 is moved along the Y-axis and how to control a distance Z, and any suitable method that is known to those skilled in the art can be adopted. One implementation example is described as an example hereinafter, only for easier understanding for those skilled in the art, it is to be understood that the example is not to limit the present invention.

Figure 13:
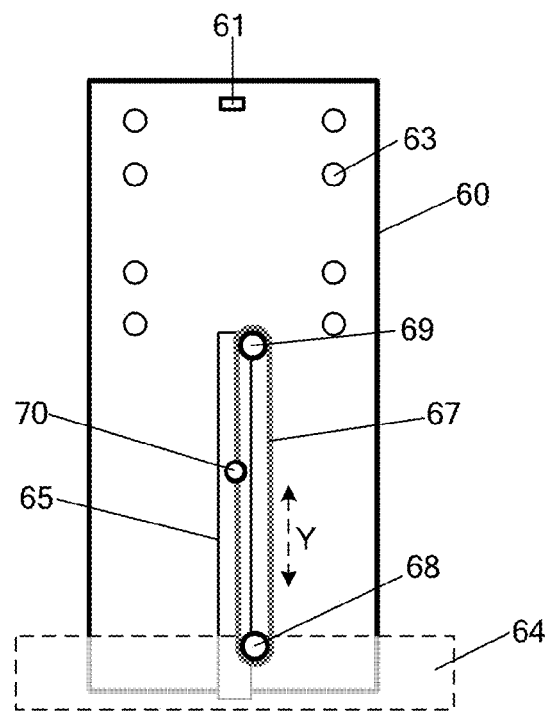
FIG. 13 is a top view of a drive structure of the anti-static device on the alignment machine in the second embodiment of the present invention.

FIG. 13 is a top view of a drive structure of an anti-static device on the alignment machine in the embodiment of the present invention. The main structure 60 of the alignment machine is formed with a surface (table-board of the alignment machine) that contacts with a substrate and the surface is disposed with a motion guide slot 65. The movable device 24 of the anti-static device can move along the motion guide slot 65. The drive control portion 64 includes a driving gear 68 and a toothed belt 67. The centre shaft 70 of the movable device 24 is fixed on the toothed belt 67 and the toothed belt 67 is engaged with the driving gear 68, which can make the movable device 24 move along the motion guide slot 65 when the driving gear 68 drives the toothed belt 67, so that the distance Z from the gas outlets 21 disposed on the movable device 24 to the periphery edge of the display panel 9 is allowed to be adjustable and controllable. In FIG. 13, the reference number 69 represents a driven gear of the toothed belt 67. In response to display panels 9 of different sizes, the position of the anti-static device can be set to be a correspondent value. Movement of the driving gear 68 and the toothed belt 67 can be controlled by the drive control portion 64, whereby the distance Z from the gas outlet 21 of the movable device 24 to the periphery edge of the display panel 9 can be adjusted automatically in the transportation processes of substrates of different sizes, so as to make the movable device 24 automatically arrive at a position that can effectively remove static charges and also automatically move away from the anti-static device after removal of static charges, and thus not incurs interference with the following manufacturing or inspecting processes.

Figure 14:
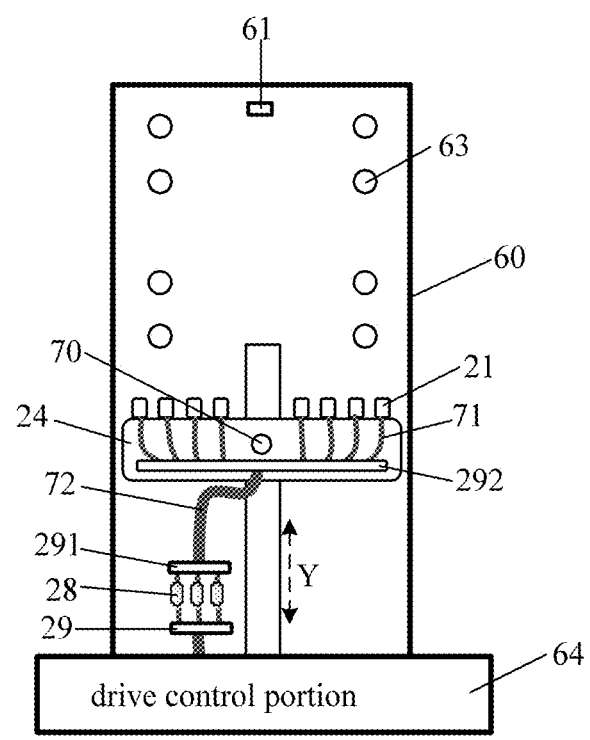
FIG. 14 is a diagram of gas pipelines of the anti-static device provided on alignment machine in the second embodiment of the present invention.

FIG. 14 is a gas pipeline diagram of an anti-static device on the above alignment machine. In FIG. 14, the reference number 21 represents gas outlets of the anti-static device; the reference number 71 represents gas supply pipes connected to the respective gas outlets 21 of the anti-static device; the reference number 72 represents a main gas supply pipe. The reference number 292 represents a third gas shunt device for connecting the main gas supply pipe 72 and the gas supply pipes 71 of the respective gas outlets. For example, gas pipelines of the anti-static device are as below: a gas pipeline coming out from the adjustable gas supply system is divided into a plurality of branch pipes via a first gas shunt device 29 and each branch pipe is provided with a solenoid valve 28, and then the branch pipes are constructed into a main gas supply pipe via a second gas shunt device 291. Then, the gas supply pipelines are directed to a movable device 24 via the main gas supply pipe 72. A plurality of gas outlets 21 is disposed on the movable device 24. The main gas supply pipe 72 is divided into a plurality of branch pipes via the third gas shunt device 292 and each branch pipe is connected to an outlet 21 via a gas supply pipe. The third gas shunt device 292 and the gas outlets 21 are disposed on the movable device 24 and configured to be movable along the Y-axis together with the movable device 24.

A distance sensor 61 senses the signal regarding the distance between the display panel 9 and the alignment machine. If the distance between the display panel 9 and the alignment machine is within a certain range, the anti-static device is powered on and when the movable device 24 moves along Y-axis to a position with a distance Z to the periphery edge of the display panel 9 (Z can be selected according to actual situations), the solenoid valve 28 is started and compressed gas including ions is sprayed out of the gas outlets 21 of the anti-static device, hence realizing static charge removal in the whole following processes, including contacting, fitting, moving and aligning between the display panel 9 and the alignment machine. After completion of alignment, the anti-static device is powered off and the gas outlets 21 stop spraying gas, and then the display panel 9 is fixed to the alignment machine via absorption of a vacuum chuck 63 for the following manufacture or inspection processes (for the time being, the movable device 24 may be moved away to avoid obstructing the following manufacture or inspection processes). Of course, if it is necessary, the anti-static device can keep on spraying the compressed gas including ions in the following manufacture or inspection processes until the display panel 9 moves away from the alignment machine. In the process that the display panel 9 leaves from the alignment machine, the anti-static device may continue spraying compressed gas including ions to remove static charges. After the display panel 9 departs from the alignment machine, the distance between the display panel 9 and the alignment machine will increase, and according to the corresponding distance signal sensed by the distance sensor 61, the solenoid valve 28 is powered off and hence the power supply of the anti-static device is switched off at the same time. In the whole process, static charge removal effect is considered as well as the requirements for saving electricity and gas. Based on the sizes of panels to be transported, it is able to control a distance Z from the movable device 24 to the periphery edge of the display panel 9 and meanwhile, start different amounts of solenoid valves 28 to regulate gas output flux for properly adjusting static charge removal ability.

Another new alignment machine is also provided in an embodiment of the present invention. As illustrated in FIG. 4 and FIG. 6, compared with the new alignment machine in above-described embodiment, the difference of the new alignment machine in this embodiment lies in that the alignment machine in this embodiment is not designed to have a movable device 24, instead, the gas outlets 21 of an anti-static device is directly disposed on a table-board 20 of the alignment machine. Of course, a vacuum chuck, a distance sensor, etc., although not illustrated in FIG. 6, are also disposed on the table-board 20 of the alignment machine. Gas pipelines connected with the outlets 21, such as a uniform pressure cabin 27, a solenoid valve 28, a first gas shunt device 29, a second gas shunt device 291 and pipes connecting these apparatuses, are all disposed in the cavity of the main structure of the alignment machine. If a distance sensor senses that the distance between a substrate and the alignment machine is within a certain range, the power supply of the anti-static device is switched on, and meanwhile the solenoid valve 28 is started. The anti-static device sprays upward, from the gas outlets 21, compressed gas including ions, which will hold up the substrate for alignment in a subsequent moving-alignment process, and meanwhile realize elimination of static charges. After completion of alignment, the anti-static device is powered off and the gas outlets 21 stop spraying gas, and then the display panel is fixed to the alignment machine via absorption of the vacuum chuck for the following manufacture or inspection processes. During the process that a display panel is going to depart from the alignment machine, firstly, the anti-static device is started and compressed gas including ions is sprayed out of the gas outlets 21 to remove static charges and meanwhile the display panel is departed from the alignment machine. As the distance between the display panel and the alignment machine is increased, according to a sensed signal of the distance sensor, the solenoid valve 28 is powered off and meanwhile the power supply of the anti-static device is switched off.

An alignment machine provided in an embodiment of the present invention, by a way of blowing compressed gas containing ions towards a substrate, alleviates friction between the substrate and the alignment machine, and meanwhile make ions contained in the gas neutralize static charges on the substrate, which can avoid static charges accumulation, so as to prevent static discharging from damaging the display panel. The anti-static device is easy for installation, use and maintenance.

The embodiment of the present invention further provides another new rotation machine. The gas sprayed out of an anti-static device may be employed in transporting of a substrate between a mechanical arm and an overturn device, and also be applied in an alignment process.

An anti-static device is provided in the overturn device. By means of gas sprayed out of the static device for bearing a substrate to make the substrate depart from the overturn device, and by means of compressed gas containing ions sprayed out of the anti-static device for alignment, generation of static charges can be effectively suppressed. The anti-static device can be disposed on a rotation machine by referring to the alignment machine mentioned above, which will not be described in detail herein any further.

In the embodiment of the present invention, compressed ionic wind (compressed gas containing ions) is employed to blow the friction surface between a substrate and a machine, whereby generation of static charges on the substrate can be effectively controlled, thus achieving the purpose of both saving energy and effectively controlling source of static charges, making the static charge removal rate greatly increased. For example, the embodiment of the present invention can be used to the equipment with a pressuring inspection chamber and a heating chamber, etc. Gas sprayed out of an anti-static device is employed to produce pressure required by the equipment and remove static charges. Gas sprayed out of an anti-static device can be also used for the equipment involving alignment, friction and transportation, etc., which can reduce friction and remove static charges.

The embodiments of the present invention are all described in a progressive manner, and the same or similar contents of the embodiments can be referred to each other. Each embodiment only highlights what is different from other embodiments.

It is understandable for those skilled in the art that realizing all or part of the processes in the method of the above described embodiments can be realized by providing instructions to relevant hardware(s) via a computer program and the program can be stored in a computer readable storage medium. The program upon being executed can include processes of respective methods as illustrated in the above embodiments. For example, the storage medium can be magnetic disk, optical disk, read-only memory (ROM) or random access memory (RAM), etc.

An anti-static method, an anti-static device and flat display manufacture equipment provided in the embodiment of the present invention, have a discharge needle disposed in a gas outlet, gas (for example, compressed gas) blown to a bottom surface of a substrate is made to contain ions that can neutralize static charges on a substrate, which are produced due to friction, to avoid accumulation of static charges, so as to prevent static discharging from damaging a display panel. In addition, the anti-static device is of low cost, and can be easily assembled, used and maintained.

What are described above is related to the illustrative embodiments of the disclosure only and not limitative to the scope of the disclosure. The scopes of the disclosure are defined by the accompanying claims.

This application claims the benefit of Chinese patent application No. 201510003164.4 filed on Jan. 5, 2015, which is incorporated by reference herein as a part of this application.

The invention claimed is:

1. An anti-static device, applied in a display manufacture field, comprising:
   an adjustable gas supply system configured for supplying gas;
   a plurality of gas outlets, wherein gas supplied by the gas adjustable system blows a bottom surface of a substrate, and the bottom surface of the substrate is a surface contacting with a display manufacture equipment; and
   discharge needles, disposed in the gas outlets and configured for ionizing air near pinpoints of the discharge needles and/or a portion of the gas passing by the pinpoints of the discharge needles by electrically discharging, making gas blown out of the gas outlets comprise ions.

2. The anti-static device according to claim 1, wherein the gas supplied by the adjustable gas supply system is compressed gas.

3. The anti-static device according to claim 1, wherein the gas outlets are disposed on a surface of the display manufacture equipment contacting with the substrate.

4. The anti-static device according to claim 1, further comprising:
   a control module, which is configured to adjust concentration of ions that reach the surface of the substrate by controlling a discharge voltage of the discharge needles, a gas flux of the outlets of the adjustable gas supply system, and/or a distance from the outlets to the surface of the substrate.

5. The anti-static device according to claim 4, further comprising:
   a movable device and a drive control portion that drives and controls movement of the movable device;
   wherein the plurality of the gas outlets are disposed on the movable device and the drive control portion is connected with the control module.

6. The anti-static device according to claim 4, wherein the adjustable gas supply system comprises a flow control module configured for controlling the gas flux, and the flow control module is connected with the control module.

7. The anti-static device according to claim 4, further comprising: a voltage supply circuit of the discharge needles, wherein the voltage supply circuit comprises a voltage regulation module, and the voltage regulation module is connected with the control module.

8. The anti-static device according to claim 4, wherein a gas injector is disposed inside the gas outlets or the gas injector directly forms the gas outlets; the gas injector comprises a filter, a gas channel and a sprayer nozzle; a gas inlet end of the gas injector is connected with the gas outlets of the adjustable gas supply system and the gas supplied by the adjustable gas supply system enters via the gas inlet end and then is sprayed out from the sprayer nozzle after passing the filter and the gas channel.

9. The anti-static device according to claim 8, wherein a gas flow passage of the gas injector is further provided with:
   a pressure control device, which is configured for measuring and adjusting pressure of gas sprayed out of the sprayer nozzle and connected with the control module.

10. The anti-static device according to claim 4, wherein a gas flow passage from the adjustable gas supply system to the gas outlets is further disposed with: a uniform pressure cabin formed by a closed space;
    a gas outlet port of the uniform pressure cabin is connected to the plurality of gas outlets or the gas outlet port directly forms the gas outlets;
    a gas inlet port of the uniform pressure cabin is connected with the gas outlets of the adjustable gas supply system via pipes.

11. The anti-static device according to claim 10, wherein the gas inlet port of the uniform pressure cabin is a pipe that gradually becomes thick.

12. The anti-static device according to claim 10, wherein a gas flow passage between the adjustable gas supply system and the gas outlets is disposed with a solenoid valve that connects with the control module.

13. The anti-static device according to claim 4, wherein a gas flow passage between the adjustable gas supply system and the gas outlets is disposed with a solenoid valve that connects with the control module.

14. The anti-static device according to claim 1, wherein a gas flow passage between the adjustable gas supply system and the gas outlets is disposed with:
    a gas shunt device, wherein a gas inlet end of the gas shunt device is connected with the gas supply pipe and the gas shunt device comprises a plurality of gas outlet ports;
    the plurality of the gas outlet ports are respectively connected to the plurality of the gas outlets or directly form the plurality of the gas outlets.

15. A flat display manufacture equipment, comprising the anti-static device according to claim 1.

16. The flat display manufacture equipment according to claim 15, further comprising: a distance sensor configured for sensing a distance between the substrate and the flat display manufacture equipment.

17. The flat display manufacture equipment according to claim 15, wherein the flat display manufacture equipment is static spinning equipment, heat-curing equipment, inspection equipment which requires applying of pressure, or alignment/rotation machine.

18. The flat display manufacture equipment according to claim 17, wherein the flat display manufacture equipment is the alignment/rotation machine, the alignment/rotation machine includes a main structure in which a cavity is disposed, and the adjustable gas supply system of the anti-static device is disposed in the cavity;
    the main structure is further provided with a surface that contacts with the substrate, a motion guide slot is provided on the surface, and the movable device of the anti-static device moves along the motion guidance slot.

19. The flat display manufacture equipment according to claim 18, wherein a drive control portion of the anti-static device comprises a driving wheel and a toothed belt; a center shaft of the movable device is fixed on the toothed belt, and the toothed belt is engaged with the driving wheel, whereby the movable device moves along the motion guide slot upon the driving wheel driving the toothed belt.

20. An anti-static method, comprising:
- employing an adjustable gas supply system to supply gas;
- providing a plurality of gas outlets, wherein gas supplied by the adjustable gas supply system blows a bottom surface of a substrate, and the bottom surface of the substrate is a surface contacting with a flat display manufacture equipment; and
- ionizing air near pinpoints of discharge needles and/or a portion of the gas passing by the pinpoints of the discharge needles by allowing the discharge needles disposed in the gas outlets to electrically discharge, making the gas blown from the gas outlets comprise ions.

* * * * *